Patented Sept. 11, 1928.

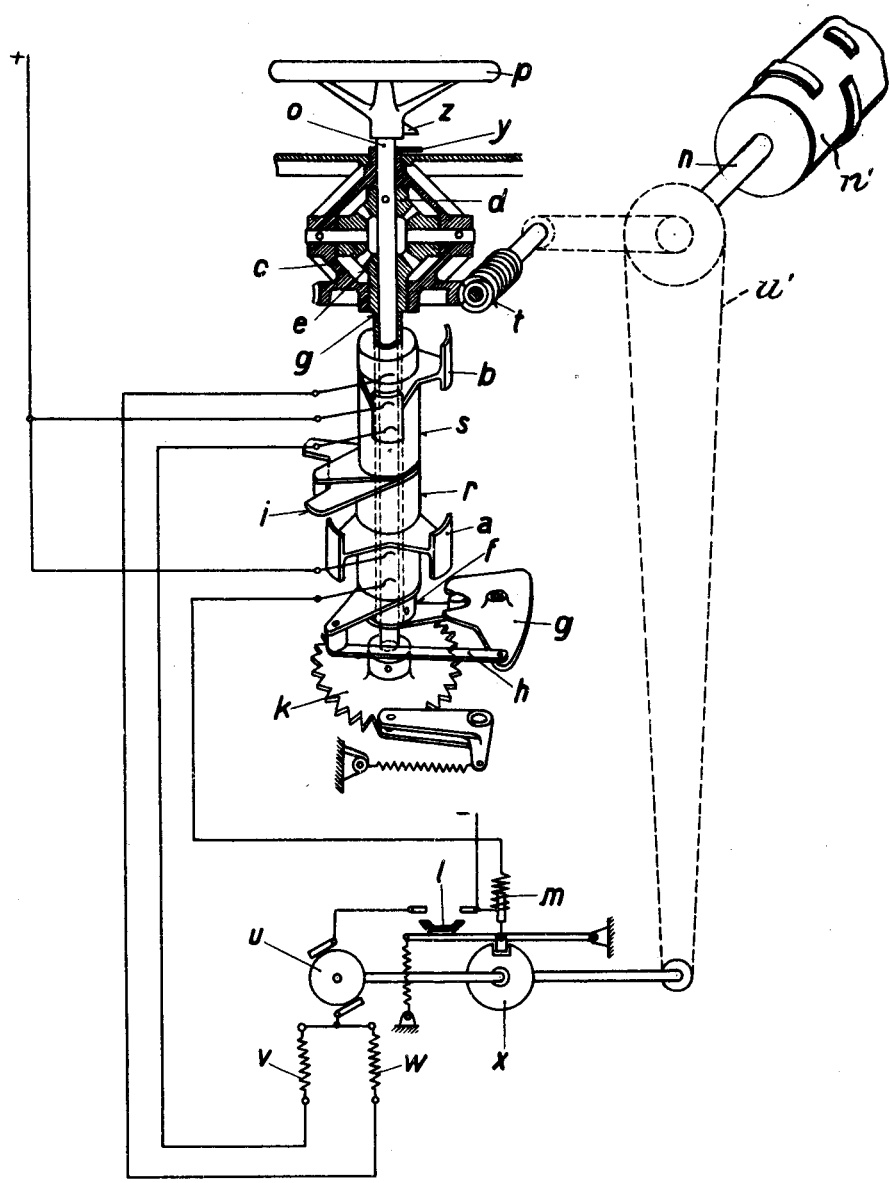

1,684,315

UNITED STATES PATENT OFFICE.

ARNOLD HALLER, OF BADEN, SWITZERLAND, ASSIGNOR TO AKTIENGESELLSCHAFT BROWN, BOVERI & CIE., OF BADEN, SWITZERLAND.

ELECTRIC CONTROL APPARATUS.

Application filed January 3, 1928, Serial No. 244,328, and in Germany December 11, 1926.

This invention relates to control gear for electric railway motors and is particularly concerned with a new type of control switch for installation in the driver's cab, by means of which the movements of the main switching drum controlling the traction motors are determined.

The object of the invention is the provision of control apparatus of the kind described which combines simplicity of construction with great flexibility of operation under working conditions.

Another object is the provision of control apparatus which permits the control handle to be set immediately to the running point desired, the step-by-step progression of the main drum being effected by suitable automatic means.

A further object is the provision of control apparatus of the kind described in which the number of contact fingers is reduced to a minimum.

Other objects of the invention will be pointed out or indicated hereinafter or will be obvious to one skilled in the art upon an understanding of the invention.

In the drawing accompanying this specification is shown one embodiment of the invention, but it is to be understood that this is presented for purpose of illustration only and is not to be accorded any interpretation having the effect of limiting the claims short of the true and most comprehensive scope of the invention in the art.

The figure in the drawing shows a partly sectional and partly perspective diagrammatic view of a railway controller embodying my invention.

The traction motors on electric locomotives and the like are frequently controlled by a motor-operated main switching drum, the position of which is determined by a master controller situated in the driving cab. Remote control systems of this kind fall into two classes, in the first of which step-by-step operation of the driver's controller is enforced either by operating instructions or by locking mechanism, whereas with apparatus of the second class the driver is at liberty to move the control handle at once to the position required, the main switching drum being then operated automatically until it reaches the position corresponding to that occupied by the controller handle. Control systems of the second class consequently provide automatic acceleration and it is with apparatus possessing this feature that the present invention is concerned.

To ensure smooth working of the control gear it is essential that the main switching drum should respond correctly to any of the following operations performed with the master controller:—

(1) Movement of control handle from zero to any given running position.

(2) Movement of control handle to increase speed.

(3) Movement of control handle to decrease speed.

(4) Return of handle to zero.

(5) Movement of control handle over a few points and immediate return to zero before the main drum has had time to respond.

Control systems capable of responding to the above conditions have already been constructed but their complicated structure has rendered them unsuitable for service in which a high degree of reliability is demanded. An essential feature of all control systems of this type is the interconnection of the main switching drum and the control drum in such a way that the latter is actuated by the progression of the main drum until it reaches the position to which the handle has been set, at which point the motor operating the main drum is automatically disconnected.

The present invention provides a very simple application of the above principle making use of a differential gear system. The three systems of wheels of the differential are coupled respectively to the control handle, the operating motor switch and the main switching drum.

An example embodying the invention is illustrated in the figure of the drawing which is a partly sectional and partly perspective view and shows the two rotating systems of the differential each connected to one of two concentric shafts. The contacts are carried by a third shaft concentric with the other two. The control handwheel $p$ is attached to the solid inner shaft $o$ which also carries the bevel wheel $d$ forming part of the differential, and the star wheel $k$. Opposite to the bevel wheel $d$ and coaxial with it is the bevel wheel $e$ attached to the intermediate hollow shaft $q$. The latter carries a roller arm $f$ which is adapted to engage with the fork lever $g$. The third and outer hollow shaft consists of two independent members $r$ and $s$ which are freely rotatable on the shaft $q$. The shaft member $r$ carries the contact segments $a$ and the member $s$ the segments $b$. The two members are connected by a slack coupling device $i$ giving a definite degree of free motion and the member $r$ is joined to the fork lever $g$ by the connecting link $h$. The casing $c$ of the differential which carries the planet wheels is driven from the shaft $n$ of the main switching drum through a self-locking worm gear $t$. The drum itself is operated by the motor $u$ through suitable transmission gear as indicated in the drawing. The operating motor $u$ is provided with two field windings $v$ and $w$ for forward and reverse running respectively, and is started and stopped by means of the circuit breaker $l$ operated by the solenoid $m$ with which is incorporated the catch mechanism $x$. The handwheel $p$ is provided with a pointer $z$ which shows the setting desired, while the pointer $y$ attached to the casing $c$ of the differential shows the instantaneous setting of the main drum.

The operation of the apparatus is as follows. When the driver turns the handwheel $p$ from zero to a selected running position, the bevel wheels $e$ and $d$ will rotate in opposite directions since the casing $c$ is held stationary by the worm $t$. The roller arm $f$, being attached to the wheel $e$ through the medium of the hollow shaft $q$, will be rotated through the same angle as the pointer $z$ on the handwheel, but in the opposite direction, and thereby rotates the fork lever $g$, until one of the contact segments $a$ is brought under the two contact fingers. These two fingers form part of the circuit containing the solenoid $m$. The shaft member $r$ which carries the segments $a$ is connected to the upper shaft member $s$ by a slack coupling device $i$, and consequently when $r$ is rotated the shaft members $s$ will be carried round likewise and the segment $b$ thereby brought beneath the co-operating contact fingers. In the present case the fingers for forward running of the motor will be affected and consequently the field winding $v$ will be connected in circuit. The movement of the segment $a$ described above will have simultaneously energized the solenoid $m$, thus closing the circuit breaker $l$ and releasing the catch mechanism $x$. The motor $u$ thereupon commences to rotate and effects the progression of the main drum at $n$ from step to step until the position corresponding to the setting of the handwheel $p$ is reached.

The main drum is continuously in connection with the casing $c$ of the differential through the medium of the worm gear $t$ and consequently as the main drum progresses the said casing will be rotated in concert therewith. The handwheel shaft $o$ is now held stationary by the star wheel $k$, however, and consequently the hollow shaft $q$ will be driven from the worm $t$ through the planet wheels of the differential and the bevel wheel $e$ in a reverse direction to that initially performed by it. The roller arm $f$ is thereby returned to its original position during which it engages the fork lever $g$ and thus rotates the segment $a$ away from the contact fingers. Current is thus cut off from the solenoid $m$, the circuit breaker $l$ disconnects the motor $u$ and the main switching drum is brought to rest in a position corresponding to the handwheel setting. The pointer $z$ will then coincide with the pointer $y$ attached to the casing $c$.

The main drum now occupies the running position originally desired when the handwheel was moved to its first setting. The segment $a$ is remote from the contact fingers, while the segment $b$ is completing the circuit of the fingers with which it is associated. In the event of the driver turning the handwheel to increase the speed, the segment $a$ again contacts but will disconnect the circuit as before as soon as the main drum has assumed its corresponding position.

When decelerating by turning the handwheel $p$ towards the zero, the second segment $a$ is brought under the fingers, while the segments $b$ effect the change-over of the motor fields so that the motor $u$ is started up in the reverse direction.

In any case the motor $u$ will cease running as soon as the pointers $y$ and $z$ coincide. It therefore follows that the driver can turn the handwheel initially beyond the running point desired and then return it to a previous position or even to zero before the switching drum has completed its motion.

The extreme simplicity of the control apparatus described above is shown by the fact that only five contact fingers co-operating with four segments are required, and furthermore by the use of the slack coupling device $i$ and the fork lever $g$ very great precision of operation is attained.

Under actual working conditions the control switch described would be combined with a reverser and possibly with a separate braking controller in addition.

Having now described my invention, what I claim as new and desire to secure by Letters Patent is:—

1. Electric control apparatus for traction motors comprising, in combination, a control handle, a motor-operated main switching drum, a control switch for the operating motor of the said main drum, a differential gear comprising three systems of wheels and interconnecting the control handle, motor control switch, and main drum aforesaid, a fork and roller lever mechanism connecting the second system of wheels of the differential with the motor control switch, and a slack coupling device connecting the aforesaid control switch with the field reversing switch of the motor operating the main drum.

2. Electric control apparatus for traction motors comprising, in combination, a control handle, a motor-operated main switching drum, a control switch for the operating motor of the said main drum, and a bevel-wheel differential gear comprising three systems of wheels and interconecting the control handle, motor control switch and main drum aforesaid, said bevel-wheel differential gear being used in conjunction with five concentric shafts, one shaft carrying the control handle, one wheel of the differential gear and star wheel, a second shaft carrying another wheel of the differential gear and the operating member for the motor control switch, a third shaft carrying the motor control switch and the operating member for the field reversing switch, a fourth shaft carrying the field reversing switch, and a fifth shaft carrying the casing of the differential gear.

In testimony whereof I have signed my name to this specification.

ARNOLD HALLER.